United States Patent [19]
Cunkelman et al.

[11] Patent Number: 6,125,872
[45] Date of Patent: Oct. 3, 2000

[54] TEMPERATURE ACTIVATED DIVERSION VALVE

[75] Inventors: Brian L. Cunkelman, Blairsville; Jennifer L. Ray, Ruffsdale, both of Pa.

[73] Assignee: Westinghouse Air Brake Company, Wilmerding, Pa.

[21] Appl. No.: 09/189,209

[22] Filed: Nov. 10, 1998

[51] Int. Cl.[7] ................................. F16K 17/38
[52] U.S. Cl. ............................. 137/75; 137/72; 137/457
[58] Field of Search .................... 137/72, 74, 75, 137/457; 236/DIG. 1

[56] References Cited

U.S. PATENT DOCUMENTS

| | | | |
|---|---|---|---|
| 3,245,423 | 4/1966 | Hansen | 137/74 |
| 3,400,888 | 9/1968 | Kosacheff | 137/457 X |
| 3,595,262 | 7/1971 | Fox et al. | 137/457 |
| 4,290,440 | 9/1981 | Sturgis | 137/75 |
| 4,488,566 | 12/1984 | Hicks | 137/74 |

FOREIGN PATENT DOCUMENTS

| | | | |
|---|---|---|---|
| 0050280 | 3/1984 | Japan | 137/457 |

*Primary Examiner*—John Rivell
*Attorney, Agent, or Firm*—James Ray & Associates

[57] ABSTRACT

A temperature activated diversion valve for supplying a first inflow fluid as an outflow fluid and for switching to supply a second inflow fluid as the outflow fluid if the first inflow fluid reaches a specified temperature. The temperature activated diversion valve includes a first inflow conduit for carrying the first inflow fluid, a second inflow conduit for carrying the second inflow fluid, an outflow conduit and a valve member. The valve member is moveable between a first position and a second position and establishes fluid communication between the first inflow conduit and the outflow conduit in the first position, while blocking fluid communication between the second inflow conduit and the outflow conduit in the first position. Additionally, the valve member establishes fluid communication between the second inflow conduit and the outflow conduit in the second position, while blocking fluid communication between the first inflow conduit and the outflow conduit in the second position. A biasing element is provided which exerts a biasing force urging the valve member toward the second position and a bonding element restrains the valve member in the first position against the biasing force exerted by the biasing element. The bonding element is thermosensitive to release the restraining of the valve member in the first position upon the bonding element attaining the specified temperature.

20 Claims, 2 Drawing Sheets

TEMPERATURE ACTIVATED DIVERSION VALVE

CROSS-REFERENCE TO RELATED APPLICATIONS

The present application relates to similar subject matter as is disclosed in U.S. patent application Ser. No. 09/189,210, filed contemporaneously herewith by Brian L. Cunkelman and Jennifer Ray, entitled "Temperature Indicator for Use in a Pressurized Environment", and in U.S. patent application Ser. No. 09/189,212, also filed contemporaneously herewith by Brian L. Cunkelman and Jennifer Ray, entitled "Pop-Up Temperature Indicator for Use in a 3-CD Type Air Compressor or Similar Device". Each of the above-referenced copending U.S. applications is hereby expressly incorporated by reference herein.

BACKGROUND OF THE INVENTION

1. Field of the Invention

The present invention relates, in general, to the field of valves and, more particularly, this invention relates to temperature activated diversion valves for diverting the flow of a fluid dependent upon the temperature of the fluid.

In preferred applications the fluid is a gas, most particularly, air. Most preferably, the fluid constitutes an air stream undergoing compression in a two-stage air compressor, such as is often used to provide compressed air for braking and other purposes in the rail transportation industry.

2. Description of the Related Art

The inventive temperature activated diversion valve is seen to have particular application to the field of air compressors and, most particularly, to two-stage air compressors which incorporate or utilize an intercooler system for cooling an already compressed air exiting from a first low compression stage and prior to entry to a second high compression stage. Even more particularly, the inventive temperature activated diversion valve is seen to have application to a thermostatically controlled intercooler system incorporated into or utilized by a two-stage compressor, wherein, in order to prevent the undue formation of condensate during the intercooling process, at least a portion of the air exiting the first low compression stage is passed through the intercooler system if it exceeds a designated temperature.

OBJECTS OF THE INVENTION

One object of the present invention is the provision of a temperature activated diversion valve which supplies a fluid flow from a first inflow conduit to an outflow conduit so long as the temperature of the fluid remains below a specified temperature, but which terminates the flow from the first inflow conduit and thereafter supplies a fluid flow from a second inflow conduit to the outflow conduit once the temperature of the fluid in the first inflow conduit has exceeded the specified temperature.

Another object of the present invention is the provision of such a temperature activated diversion valve which is relatively simple in construction and operation and, therefore, inexpensive to manufacture and reliable in operation.

In addition to the objects and advantages of the present invention described above, various other objects and advantages of the invention will become more readily apparent to those persons skilled in the relevant art from the following more detailed description of the invention, particularly, when such description is taken in conjunction with the attached drawing Figures and with the appended claims.

SUMMARY OF THE INVENTION

In one aspect, the instant invention provides a temperature activated diversion valve for supplying a first inflow fluid as an outflow fluid and for switching to supply a second inflow fluid as the outflow fluid if the first inflow fluid attains a specified temperature. The temperature activated diversion valve includes a first inflow conduit for carrying the first inflow fluid, a second inflow conduit for carrying the second inflow fluid, an outflow conduit and a valve member. The valve member is moveable between a first position and a second position and establishes fluid communication between the first inflow conduit and the outflow conduit in the first position, while blocking fluid communication between the second inflow conduit and the outflow conduit in the first position. Additionally, the valve member establishes fluid communication between the second inflow conduit and the outflow conduit in the second position, while blocking fluid communication between the first inflow conduit and the outflow conduit in the second position. A biasing element is provided which exerts a biasing force urging the valve member toward the second position and a bonding element restrains the valve member in the first position against the biasing force exerted by the biasing element. The bonding element is thermosensitive to release the restraining of the valve member in the first position upon the bonding element attaining the specified temperature.

In another aspect, the present invention provides a temperature activated diversion valve for selectively directing a flow of a fluid in a conduit arrangement. The conduit arrangement includes a first inflow conduit, a second inflow conduit and an outflow conduit. Such temperature activated diversion valve is effective to direct the fluid flow from one of the first inflow conduit and the second inflow conduit to the outflow conduit. The is temperature activated diversion valve includes a valve member movable between a first position and a second position. Such valve member opens the first inflow conduit in the first position and closes the second inflow conduit in the first position. The valve member additionally opens the second inflow conduit in the second position and closes the first inflow conduit in the second position. The temperature activated diversion valve further includes a biasing element exerting a biasing force urging the valve member toward the second position and a bonding element restraining the valve member in the first position against the biasing force exerted by the biasing element. The bonding element is exposed to the fluid and is thermosensitive to release the restraining of the valve member in the first position upon the bonding element attaining a specified temperature.

BRIEF DESCRIPTION OF THE DRAWINGS

The invention will now be described by way of a preferred embodiment, reference being had to the accompanying drawings, wherein.

DETAILED DESCRIPTION OF THE PREFERRED EMBODIMENT

Figure 1:
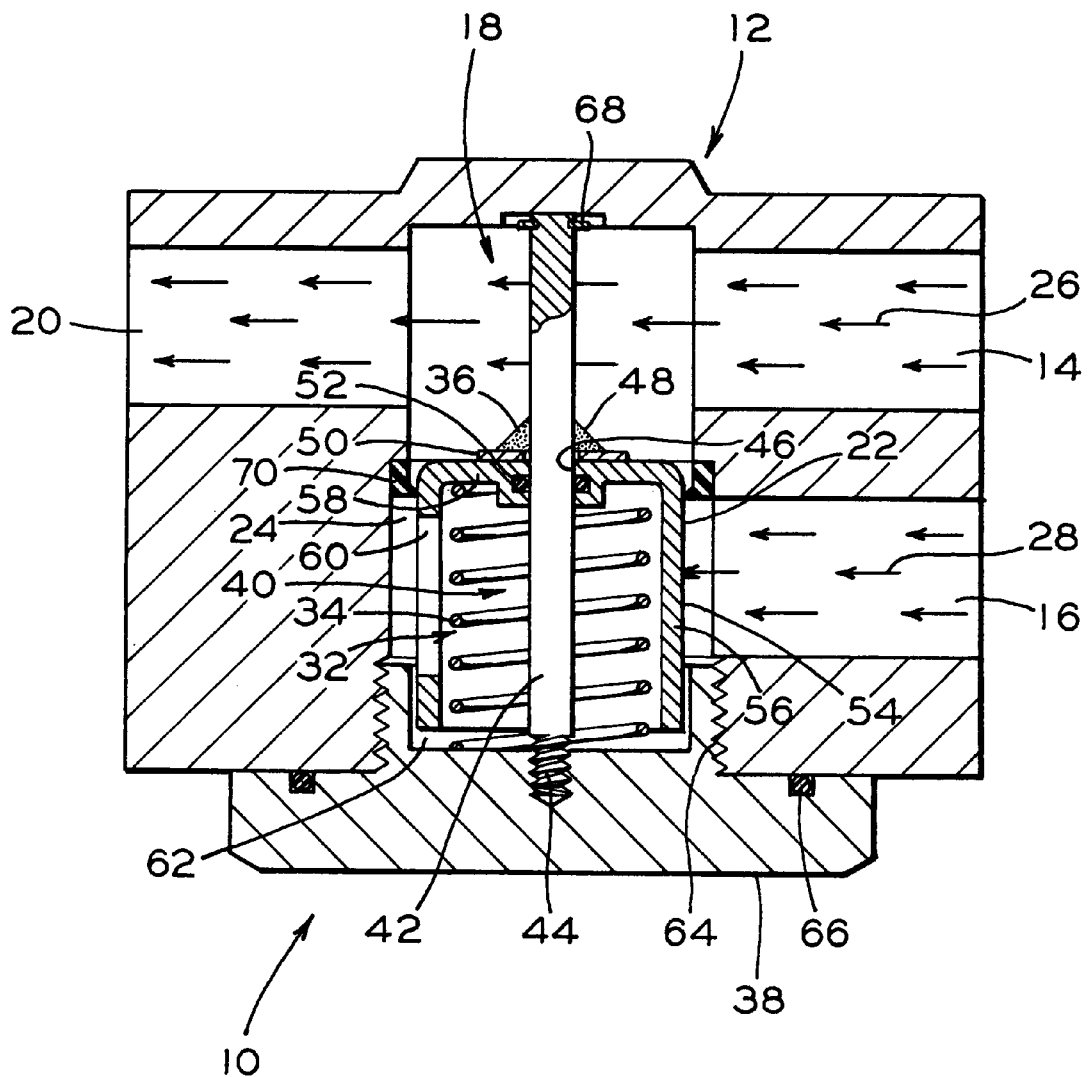
FIG. 1 is a cross-sectional elevational view of a temperature activated diversion valve according to the invention, showing the valve in a first valve position prior to any exposure to fluid having a temperature exceeding a specified temperature and wherein fluid passing through the valve and thereafter to an outflow conduit originates from a first inflow conduit.

Referring initially most particularly to FIG. 1, a temperature activated diversion valve, generally designated 10, according to the present invention is adapted to direct the flow of a fluid in a conduit arrangement 12. The conduit arrangement 12 includes a first inflow conduit 14 and a second inflow conduit 16. Each of such first inflow conduit 14 and such second inflow conduit 16 flows into a conduit junction 18 to form an outflow conduit 20 which flows outward from the conduit junction 18.

The temperature activated diversion valve 10 itself generally includes a valve member 22 which is movable between a first valve position (shown in FIG. 1) and a second valve position (shown in FIG. 2) to selectively permit flow from only one of the first and second inflow conduits 14 and 16, respectively, to the outflow conduit 20.

In the first valve position 24, shown in FIG. 1, the valve member 22 opens the first inflow conduit 14, thereby permitting a first fluid inflow 26 carried therein to pass to the outflow conduit 20, while simultaneously closing the second inflow conduit 16 and blocking passage of a second inflow fluid 28 therein. Conversely, in a second valve position 30, shown in FIG. 2, the valve member 22 opens the second inflow conduit 16, thereby permitting the second fluid inflow 28 carried therein to pass to the outflow conduit 20, while simultaneously closing the first inflow conduit 14 and blocking the passage of the first fluid inflow 26.

Such valve member 22 is urged toward such second valve position 30 by a biasing element 32, preferably in the form of a coil spring 34. However, the valve member 22 is restrained in the first valve position 24 by a bonding element 36 (seen in FIG. 1). The bonding element 36 is formed of a thermosensitive bonding material which substantially releases its bonding force upon reaching a specified temperature. Preferably, the bonding element 36 includes Indium (In) and, even more preferably the bonding element 36 is an Indium (In) alloy. Indium (In) alloys are available which melt, and thereby reduce their bonding force, upon attaining various specified temperatures. One of the various sources of such Indium (In) alloys is Indium Corporation of America®. However, while an Indium (In) alloy is presently preferred for use in bonding element 36, various other bonding materials which undergo a substantial reduction in bonding force upon exposure to specific temperature ranges are well known to those of ordinary skill in the art and may be used in place of the presently preferred Indium (In) alloy bonding agent.

The temperature activated diversion valve 10 additionally includes a base member 38. Such base member 38 is provided with a guide mechanism 40 for guiding the valve member 22 in its transition between the first and second valve positions 24 and 30, respectively. Preferably, as shown, the guide mechanism 40 is provided in the form of a shaft member 42 which projects outward from the base member 38 and is secured thereto by a threaded connection 44. The valve member 22 is slidingly engaged with the shaft member 42 which projects through a hole 46 provided in the valve member 22. The coil spring 34 is disposed about the shaft member 42 between the base member 38 and the valve member 22 and exerts its biasing force therebetween.

As shown in FIG. 1, the bonding element 36 is disposed within the conduit junction 18 such that it is exposed to the first fluid inflow 26 from the first inflow conduit 14. Preferably, as shown in FIG. 1, the bonding element 36 is disposed on the opposite side of the valve member 22 from the coil spring 34. Even more preferably, the bonding element 36 adheres to the shaft member 42 and projects radially therefrom to thereby form a stop member 48 or radial protrusion (shown in FIG. 1) on the shaft member 42.

A washer 50 is preferably positioned between the bonding element 36 forming the stop member 48 and the valve member 22 to distribute the biasing force exerted by the coil spring 34 and a flexible sealing element 52, preferably an O-ring, surrounds the shaft member 42 to prevent leakage through the hole 46.

The valve member 22 is preferably provided in the form of a cup-shaped member 54 which has a substantially upstanding wall portion 56 extending from a disc-shaped portion 58 that extends radially outward from the shaft member 42. An aperture 60 is provided in the upstanding wall portion 56 and aligns with the outflow conduit 20 when the valve member 22 is in the second valve position 30. On the other hand, when such valve member 22 is in the first valve position 24, the aperture 60 will be substantially non-aligned with the outflow conduit 20 and flow through the aperture 60 to the outflow conduit 20 is prevented.

In order to allow mounting of the temperature activated diversion valve 10, the conduit junction 18 is provided with an opening 62 and an attachment mechanism 64 is furnished for connecting the temperature activated diversion valve 10 thereto. Preferably, the attachment mechanism 64 takes the relatively simple form of a threaded coupling provided on such base member 38 and the opening 62, although various other well known attachment apparatuses may clearly be substituted. An additional flexible sealing member 66, again preferably an O-ring, is disposed between the base member 38 and the opening 62 to prevent leakage.

Figure 2:
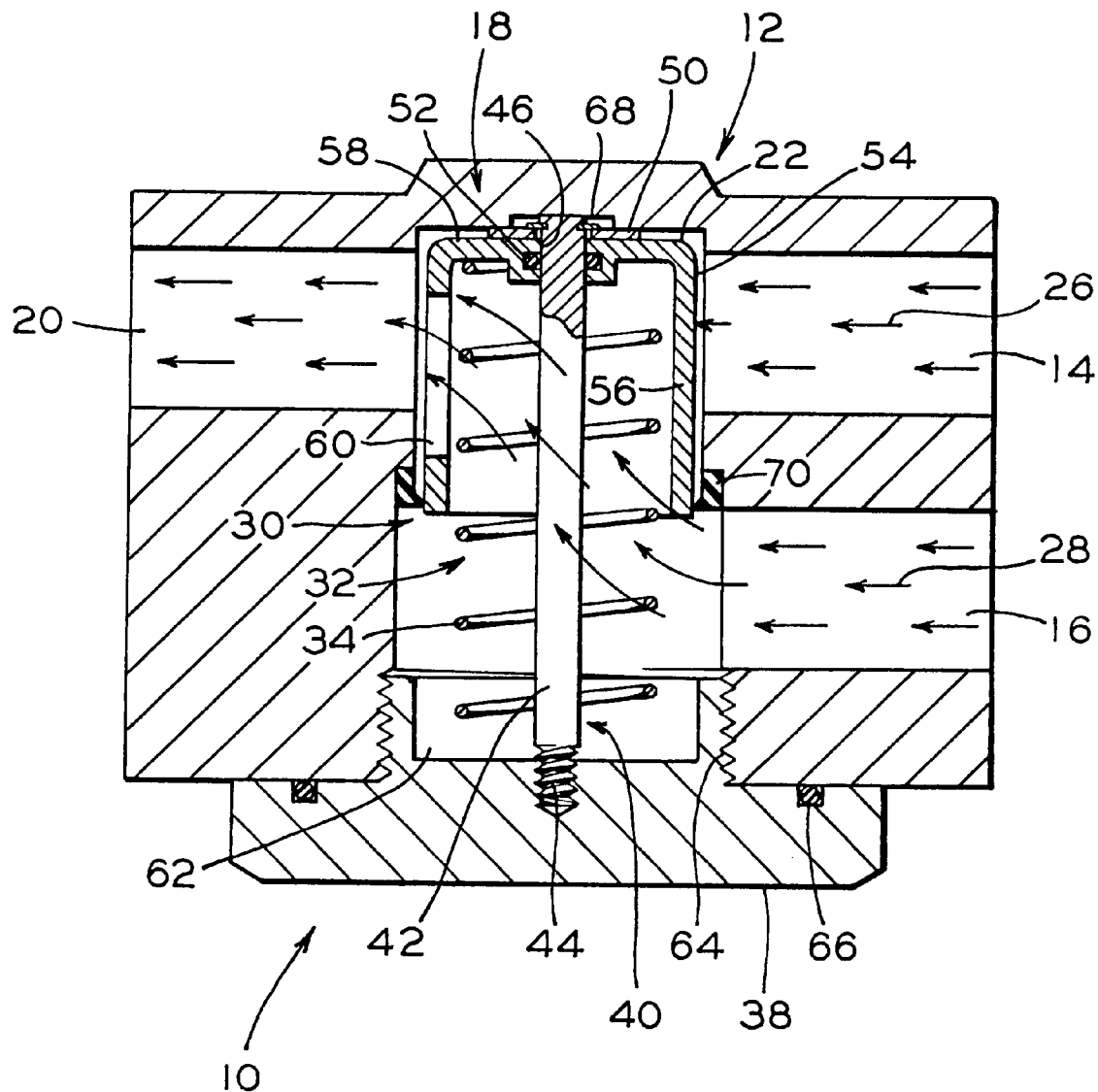
FIG. 2 is a cross-sectional elevational view of the inventive temperature activated diversion valve, showing the valve in a second valve position following exposure to a fluid exceeding the specified temperature and wherein the fluid passing through the valve and thereafter to the outflow conduit originates from a second inflow conduit.

The distal end of the shaft member 42 is fitted with a retaining member 68, preferably in the form of a so-called "snap ring" to prevent the valve member 22 from becoming disassociated from the shaft member 42 in the event where the temperature activated diversion valve 10 is removed from the conduit arrangement 12 shown in FIG. 1, after it has been activated, i.e., after it has achieved the FIG. 2 configuration. In order to prevent leakage around the perimeter of such valve member 22, a flexible "lip type seal" 70 is disposed about the periphery thereof.

The operation of the temperature activated diversion valve 10 can be seen clearly from a comparison of FIGS. 1 and 2. The bonding element 36 is exposed to the first fluid inflow 26 through the first inflow conduit 14. So long as the temperature of the first fluid inflow 26 does not exceed the specified temperature, such bonding element 36, which forms the protrusion and/or stop member 48 extending radially from the shaft member 42, prevents the valve member 22 from movement under the force exerted by the coil spring 34. Fluid communication is then maintained between the first inflow conduit 14 and the outflow conduit 20, while the second inflow conduit 16 is maintained in a closed position by the valve member 22.

If the temperature of the bonding element 36 substantially reaches the specified temperature through exposure to the first inflow fluid 26, the restraint exerted by the bonding element 36 is substantially removed, thereby allowing the valve member 22 to move to the FIG. 2 position, wherein the first inflow conduit 14 is substantially blocked, while a fluid communication is established from the second inflow conduit 16, through the aperture 60 and to the outflow conduit 20.

The inventive temperature activated diversion valve 10 may be preferably employed in order to monitor the temperature of a compressed air flow in a two-stage air compressor, such as, for example, in a so-called "3-CD" air compressor as is manufactured by Westinghouse Air Brake Company for the rail transportation industry. Such a "3-CD" type air compressor commonly employs a pair of low pressure cylinders which compress air to a first low pressure and then feed a common high compression cylinder where the air is compressed to a second higher temperature. The present inventive temperature activated diversion valve is seen to have particular application to monitoring the air entering the high compression cylinder in such a "3-CD" type compressor or other similar air compressor.

A "3-CD" type air compressor is described in U.S. Pat. No. 5,106,270 issued on Apr. 21, 1992 to Goettel et al and entitled "Air-Cooled Air Compressor" and in the publication "Instructions for Disassembly, Repair and Assembly of '3-CD' Air Compressors", published for the rail transportation industry by Westinghouse Air Brake Company in 1994, both this patent and this publication being hereby expressly incorporated by reference herein.

To withstand the required elevated temperatures, the flexible sealing element 52, the second flexible sealing member 66 and the single lip seal 70 are preferably formed of a heat resistant material, such as Viton® or Teflon®.

While the present invention has been described by way of a detailed description of a particularly preferred embodiment, it will be readily apparent to those of ordinary skill in the art that various substitutions of equivalents may be affected without departing from the spirit or scope of the invention as set forth in the appended claims.

What is claimed is:

1. A temperature activated diversion valve for supplying a first inflow fluid as an outflow fluid and for switching to supply a second inflow fluid as such outflow fluid if such first inflow fluid attains a specified temperature, said temperature activated diversion valve comprising:

a first inflow conduit for carrying such first inflow fluid;
   a second inflow conduit for carrying such second inflow fluid;
   an outflow conduit;
   a valve member;
      said valve member being moveable between a first position and a second position;
      said valve member establishing fluid communication between said first inflow conduit and said outflow conduit in said first position;
      said valve member substantially blocking fluid communication between said second inflow conduit and said outflow conduit in said first position;
      said valve member establishing fluid communication between said second inflow conduit and said outflow conduit in said second position; and
      said valve member substantially blocking fluid communication between said first inflow conduit and said outflow conduit in said second position;
   a biasing element exerting a biasing force urging said valve member toward said second position; and
   a bonding element restraining said valve member in said first position against said biasing force exerted by said biasing element;
      said bonding element being thermosensitive to substantially release said restraining of said valve member in said first position upon said bonding element substantially attaining said specified temperature.

2. A temperature activated diversion valve, according to claim 1, wherein said bonding element is substantially exposed to such first inflow fluid through said first inflow conduit when said valve member is in said first position.

3. A temperature activated diversion valve, according to claim 2, wherein said temperature activated diversion valve additionally comprises:

a base member; and
   guide means for guiding said valve member between said first and second positions;
      said guide means being connected to said base member.

4. A temperature activated diversion valve, according to claim 3, wherein said biasing element is disposed substantially between said base member and said valve member.

5. A temperature activated diversion valve, according to claim 4, wherein said guide means comprises a shaft member extending outward from said base member.

6. A temperature activated diversion valve, according to claim 5, wherein said valve member is slidingly engaged with said shaft member.

7. A temperature activated diversion valve, according to claim 6, wherein said valve member is provided with a hole and said shaft member extends through said hole provided in said valve member.

8. A temperature activated diversion valve, according to claim 7, wherein said valve member comprises a substantially cup-shaped member having a wall portion, said wall portion of said substantially cup-shaped member being provided with at least one aperture and said at least one aperture provided in said wall portion substantially aligning with said outflow conduit when said valve member is in said second position.

9. A temperature activated diversion valve, according to claim 8, wherein said at least one aperture provided in said wall portion is substantially non-aligned with said outflow conduit when said valve member is in said first position.

10. A temperature activated diversion valve, according to claim 9, wherein said first and second inflow conduits substantially meet at a conduit junction to form said outflow conduit, said conduit junction being provided with an opening for receiving said temperature activated diversion valve, wherein said base member is provided with attachment means for attaching said base member to said conduit junction, wherein said biasing element comprises a coil spring, said coil spring being disposed about said shaft member, and wherein said temperature activated diversion valve additionally comprises:

a first flexible sealing member disposed about said shaft member and adjacent said hole provided in said valve member;
   a second flexible sealing member disposed adjacent said base member to thereby surround said opening in said conduit junction when said base member is attached to said conduit junction by said attachment means;
   a retaining member disposed at a distal end of said shaft member; and
   a washer member surrounding said shaft member and disposed between said bonding element and said substantially cup-shaped member.

11. A temperature activated diversion valve, according to claim 5, wherein said temperature activated diversion additionally comprises a stop member, said stop member comprising said bonding element, said bonding element adhering to said shaft member and being disposed on an opposite side of said valve member from said biasing element and said bonding element extending substantially radially from said shaft member to thereby form at least a portion of said stop member.

12. A temperature activated diversion valve, according to claim 11, wherein said valve member is provided with a hole, said shaft member extends through said hole provided in said valve member and said valve member is slidingly engaged with said shaft member.

13. A temperature activated diversion valve, according to claim 12, wherein said valve member comprises a substantially cup-shaped member having a peripheral wall portion, said peripheral wall portion of said substantially cup-shaped member being provided with at least one throughgoing aperture, said at least one throughgoing aperture provided in said peripheral wall portion being substantially aligned with said outflow conduit when said valve member is in said second position and said at least one throughgoing aperture provided in said peripheral wall portion being substantially non-aligned with said outflow conduit when said valve member is in said first position.

14. A temperature activated diversion valve, according to claim 13, wherein each of such first and second inflow fluids and such outflow fluid are gas, said first and second inflow conduits substantially meet at a conduit junction to form said outflow conduit, said conduit junction is provided with an opening for receiving said temperature activated diversion valve and said base member is provided with attachment means for attaching said base member to said conduit junction, said bonding element comprises at least one of Indium and an Indium alloy, said biasing element is a coil spring, said coil spring being disposed about said shaft member and wherein said temperature activated diversion valve additionally includes;
 (a) a first flexible sealing member disposed about said shaft member and adjacent said hole provided in said valve member;
 (b) a second flexible sealing member disposed adjacent to said base member to thereby surround said opening in said conduit junction when said base member is attached to said conduit junction by said attachment means;
 (c) a retaining member disposed at a distal end of said shaft member; and
 (d) a washer member surrounding said shaft member and disposed between said stop member and said substantially cup-shaped member.

15. A temperature activated diversion valve for selectively directing a flow of a fluid in a conduit arrangement, such conduit arrangement including a first inflow conduit, a second inflow conduit and an outflow conduit, said temperature activated diversion valve being effective to direct such fluid flow from one of such first inflow conduit and such second inflow conduit to such outflow conduit, said temperature activated diversion valve comprising:
 (a) a valve member movable between a first position and a second position, said valve member substantially opening such first inflow conduit in said first position, said valve member substantially closing such second inflow conduit in said first position, said valve member substantially opening such second inflow conduit in said second position and said valve member substantially closing such first inflow conduit in said second position;
 (b) a biasing element exerting a biasing force urging said valve member toward said second position; and
 (c) a bonding element restraining said valve member in said first position against said biasing force exerted by said biasing element, said bonding element being substantially exposed to such fluid and said bonding element being thermosensitive to substantially release said restraining of said valve member in said first position upon said bonding element substantially attaining a specified temperature.

16. A temperature activated diversion valve, according to claim 15, wherein said valve member includes a wall portion, said wall portion of said valve member substantially opening such first inflow conduit in said first position, said wall portion of said valve member substantially blocking such second inflow conduit in said first position, said wall portion of said valve member substantially opening such second inflow conduit in said second position and said wall portion of said valve member substantially blocking such first inflow conduit in said second position.

17. A temperature activated diversion valve, according to claim 16, wherein said temperature activated diversion valve additionally comprises guide means for guiding said valve member between said first and second positions.

18. A temperature activated diversion valve, according to claim 17, wherein such first inflow conduit and such second inflow conduit are disposed in substantial side by side relationship and said guide means comprises a shaft member and wherein said valve member is slidingly engaged with said shaft member to translate along said shaft member between said first and second positions.

19. A temperature activated diversion valve, according to claim 18, wherein said temperature activated diversion valve additionally comprises an aperture formed in said valve member, said aperture being substantially aligned with such outflow conduit in said second position and said aperture being substantially non-aligned with such outflow conduit in said first position.

20. A temperature activated diversion valve, according to claim 19, wherein said temperature activated diversion valve additionally includes a base member, said shaft member extending outward from said base member across at least a portion of each of such first and second inflow conduits, said bonding element includes a radial protrusion extending radially from said shaft member, said radial protrusion of said bonding element is exposed to such first inflow fluid through such first inflow conduit and wherein said valve member comprises a substantially cup-shaped member having a disc-shaped portion extending radially outward from said shaft member and said wall portion comprises at least a partially peripheral wall portion upstanding from said disc-shaped portion and said biasing element comprises a coil spring disposed substantially between said base member and said substantially cup-shaped member and said bonding element is an Indium alloy and such first inflow fluid, such second inflow fluid and such outflow fluid are gas.

* * * * *